United States Patent
Toeda

(10) Patent No.: US 10,513,624 B2
(45) Date of Patent: Dec. 24, 2019

(54) ACTIVE RAY-CURABLE INKJET INK AND IMAGE FORMING METHOD

(71) Applicant: Konica Minolta, Inc., Tokyo (JP)

(72) Inventor: Takayuki Toeda, Tokyo (JP)

(73) Assignee: KONICA MINOLTA, INC., Tokyo (JP)

( * ) Notice: Subject to any disclaimer, the term of this patent is extended or adjusted under 35 U.S.C. 154(b) by 0 days.

(21) Appl. No.: 16/099,305

(22) PCT Filed: May 22, 2017

(86) PCT No.: PCT/JP2017/018998
§ 371 (c)(1),
(2) Date: Nov. 6, 2018

(87) PCT Pub. No.: WO2017/217187
PCT Pub. Date: Dec. 21, 2017

(65) Prior Publication Data
US 2019/0211222 A1    Jul. 11, 2019

(30) Foreign Application Priority Data

Jun. 17, 2016    (JP) .................................. 2016-120613

(51) Int. Cl.
*C09D 11/328* (2014.01)
*C09D 11/322* (2014.01)
*C09D 11/38* (2014.01)
*B41M 7/00* (2006.01)

(52) U.S. Cl.
CPC ........... *C09D 11/38* (2013.01); *B41M 7/0081* (2013.01); *C09D 11/322* (2013.01)

(58) Field of Classification Search
CPC ..... C09D 11/38; C09D 11/322; C09D 11/328; C09D 11/101; B41M 7/0081; B41M 5/00; C09B 23/148; C09B 23/105; C09B 57/00
See application file for complete search history.

(56) References Cited

U.S. PATENT DOCUMENTS

| | | | | |
|---|---|---|---|---|
| 2010/0086701 A1* | 4/2010 | Iftime | .................. | C09D 11/101 427/511 |
| 2013/0141505 A1* | 6/2013 | Ikeda | .................. | C09D 11/101 347/104 |

FOREIGN PATENT DOCUMENTS

| | | |
|---|---|---|
| EP | 3357980 A1 | 8/2018 |
| JP | 2006-249155 A | 9/2006 |
| JP | 2009-132919 A | 6/2009 |
| JP | 2010-106275 A | 5/2010 |
| JP | 2012-31254 A | 2/2012 |
| JP | 2012-207199 A | 10/2012 |

OTHER PUBLICATIONS

International Search Report dated Jun. 20, 2017 from corresponding International Application No. PCT/JP2017/018998 and English translation.
Extended European Search Report dated Apr. 24, 2019 from corresponding Application No. 17813090.2.

* cited by examiner

Primary Examiner — Scott A Richmond
(74) Attorney, Agent, or Firm — Lucas & Mercanti, LLP

(57) ABSTRACT

The present invention relates to: an active ray-curable inkjet ink which has high gloss and is capable of forming an image that is suppressed in gloss difference between itself and a base; and an image forming method which uses this active ray-curable inkjet ink. An active ray-curable inkjet ink according to the present invention contains a photopolymerizable compound, a photoinitiator and a crystalline gelling agent, and is capable of undergoing a sol-gel phase transition. This active ray-curable inkjet ink is characterized by additionally containing a fluorescent bleaching agent.

8 Claims, No Drawings

ACTIVE RAY-CURABLE INKJET INK AND IMAGE FORMING METHOD

This application is a 371 of International Application No. PCT/JP2017/018998 filed on May 22, 2017, which claimed the priority of Japanese Application No. 2016-120613 filed on Jun. 17, 2016, both applications are incorporated herein by reference.

TECHNICAL FIELD

The present invention relates to an actinic radiation-curable inkjet ink and an image forming method.

BACKGROUND ART

Formation of images by inkjetting is employed in various fields of printing because this method is applicable to high-mix low-volume production. As one of image forming methods employing the inkjetting, there is a method in which a droplet of an inkjet ink caused to land on a substrate is cured with actinic radiation (hereinafter also referred to as the "actinic radiation-curable inkjet recording method").

The actinic radiation-curable inkjet ink to be used for this recording method has been widely studied. For example, each of PTLs 1 to 3 describes an actinic radiation-curable inkjet ink containing a fluorescent brightener as a sensitizer to be used for improving the curability of an ink.

In recent years, an actinic radiation-curable inkjet ink that contains a gelling agent and undergoes sol-gel phase transition according to the temperature (hereinafter also simply referred to as the "gel ink") has been developed. The gel ink is in a sol state when heated, and can be discharged through a nozzle of an inkjet head, and when the ink lands on a substrate after being discharged, it is cooled to undergo gelation, and thus, the gel ink has a characteristic of a high pinning property after landing. When the gel ink pinned on the surface of a substrate is irradiated with actinic radiation, the gel ink is cured on the surface of the substrate to form an image.

Various techniques for forming a desired image using a gel ink have been studied. For example, PTL 4 describes a method for controlling glossiness of an image by providing, on an image, a UV curable overcoat composition containing a gelling agent, a curable monomer, a curable wax, and a photopolymerization initiator if necessary. Besides, PTL 5 describes a curable ink having a characteristic to closely match glossiness of a printed region on a substrate with glossiness of an unprinted region.

CITATION LIST

Patent Literatures

PTL 1: Japanese Patent Application Laid-Open No. 2006-249155

PTL 2: Japanese Patent Application Laid-Open No. 2012-31254

PTL 3: Japanese Patent Application Laid-Open No. 2012-207199

PTL 4: Japanese Patent Application Laid-Open No. 2010-106275

PTL 5: Japanese Patent Application Laid-Open No. 2009-132919

SUMMARY OF INVENTION

Technical Problem

When irradiated with actinic radiation (ultraviolet rays) or the like, a gel ink is cured, and at this point, a gelling agent, particularly a crystalline gelling agent, is not incorporated into a polymer chain formed through polymerization of a photocurable compound but crystallizes to partly move to the vicinity of the surface of a cured film. As the crystal thus moving to the vicinity of the surface of the cured film is larger, irregularities caused on the surface of the cured film become larger to degrade the glossiness of a resultant image. Therefore, the glossiness of an image formed by using a gel ink tends to be lower than the glossiness of an image formed by using an ink not containing a gelling agent. In order to form, on a variety of substrates, images causing less glossiness incompatibility, it has been desired to improve the glossiness of an image formed using an ink containing a crystalline gelling agent.

In using the overcoat composition described in PTL 4, the base glossiness of the overcoat composition is adjusted by changing the amount of the curable wax to be contained therein. The composition described in PTL 4 is, however, an overcoat to be provided on an image to be formed, and is not an ink to be used for forming an image. Besides, preferable examples of the ink of PTL 5 include a gel ink containing a gelling agent having a curable group, and it is stated that the gel ink has low glossiness on normal paper and high glossiness on coated paper due to gel rheology. According to examination made by the present inventor, however, the glossiness of an image formed on coated paper using the ink of PTL 5 is not sufficiently high to avoid the glossiness incompatibility.

The present invention was devised in consideration of the above-described problems, and an object is to provide an actinic radiation-curable inkjet ink containing a crystalline gelling agent capable of forming an image having high glossiness, and an image forming method using the same.

Solution to Problem

A first aspect of the present invention resides in an actinic radiation-curable inkjet ink below.

[1] An actinic radiation-curable inkjet ink capable of undergoing sol-gel phase transition, including a photocurable compound, a photopolymerization initiator and a crystalline gelling agent, in which the actinic radiation-curable inkjet ink further comprises a fluorescent brightener.

[2] The actinic radiation-curable inkjet ink according to [1], in which a content of the fluorescent brightener is 0.01 mass % or more and 1.0 mass % or less with respect to a total mass of the actinic radiation-curable inkjet ink.

[3] The actinic radiation-curable inkjet ink according to [1] or [2], in which the fluorescent brightener contains a compound represented by the following general formula (1):

[Formula 1]

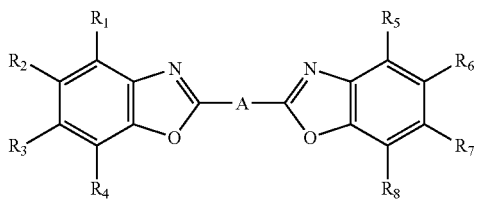
(1)

in which $R_1$ to $R_8$ each independently represent a hydrogen atom or an alkyl group, and A represents a linking group represented by any of the following formulas (2) to (5):

[Formula 2]

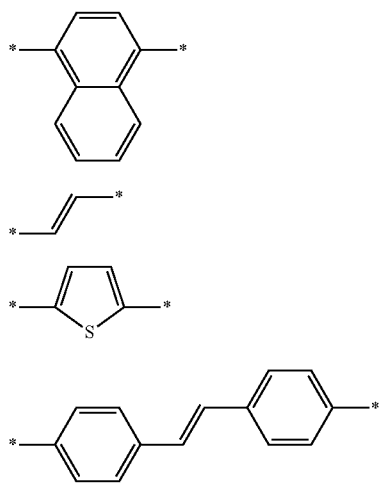

(2)

(3)

(4)

(5)

in which each * represents a bonding position of A in each formula.

[4] The actinic radiation-curable inkjet ink according to any one of [1] to [3], in which a content of the crystalline gelling agent is 1 mass % or more and 10 mass % or less with respect to a total mass of the actinic radiation-curable inkjet ink.

[5] The actinic radiation-curable inkjet ink according to any one of [1] to [4], in which the crystalline gelling agent contains at least one selected from the group consisting of compounds represented by the following general formulas (G1) and (G2):

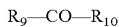         General formula (G1):

        General formula(G2):

in which $R_9$ to $R_{12}$ each independently represent a straight chain or branched chain hydrocarbon group having 9 or more and 25 or less carbon atoms.

[6] The actinic radiation-curable inkjet ink according to any one of [1] to [5], further including a colorant.

A second aspect of the present invention resides in an image forming method below.

[7] An image forming method, including: discharging the actinic radiation-curable inkjet ink according to any one of [1] to [6] from a nozzle of an inkjet recording apparatus and causing the actinic radiation-curable inkjet ink to land on a substrate; and curing the actinic radiation-curable inkjet ink by irradiating, with actinic radiation, the actinic radiation-curable inkjet ink landed on the substrate.

Advantageous Effects of Invention

According to the present invention, an actinic radiation-curable inkjet ink containing a crystalline gelling agent capable of forming an image having high glossiness, and an image forming method using the same are provided.

DESCRIPTION OF EMBODIMENTS

As a result of earnest studies to develop a gel ink capable of forming an image having high glossiness, the present inventor has found that glossiness of an image formed using a gel ink containing a crystalline gelling agent and a fluorescent brightener is higher than that of an image formed using a gel ink not containing a fluorescent brightener. A fluorescent brightener refers to a kind of fluorescent dyes for fiber products, paper and synthetic resins, and is a compound also used as a sensitizer, in the field of inks, by utilizing fluorescence thereof as described in PTLs 1 to 3. In the present invention, attention is paid to the crystallinity of a fluorescent brightener, and glossiness of an image formed using a gel ink can be successfully increased by combining the fluorescent brightener with a crystalline gelling agent. The reason why glossiness of an image is increased by adding a fluorescent brightener is presumed as follows.

A crystalline gelling agent contained in a gel ink is cooled to crystallize when landing on a substrate after being discharged. At this point, the crystalline gelling agent forms a card house structure in which plate-shaped crystals are physically combined. When a liquid component is held in a void of the card house structure, the pinning property of an ink droplet after landing is easily increased. The crystal of the gelling agent is, however, not incorporated into a polymer chain of a photocurable compound formed through irradiation of the gel ink with actinic radiation (ultraviolet rays) or the like, but partly moves to the vicinity of the surface of a cured film, and therefore, when the crystal structure is too large, irregularities caused on the surface of the cured film is increased to degrade the glossiness of a resultant image.

When a fluorescent brightener is contained in the gel ink, as the polymerization of the photocurable compound proceeds through the irradiation with the actinic radiation, the amount of the photocurable compound (monomer) is reduced, and hence the concentration of the fluorescent brightener relatively increases. When the concentration of the fluorescent brightener exceeds its solubility, the fluorescent brightener is crystallized. At this point, the crystal of the fluorescent brightener wedges into voids or the like of the card house structure precedently formed by the crystal of the gelling agent so as to make the crystal structure fine. As a result, the crystal size of the gelling agent moving to the vicinity of the surface of the cured film is reduced, and hence the irregularities caused on the surface of the cured film are reduced, which probably increases the glossiness of a resultant image.

The present invention will now be described with reference to exemplary embodiments, and it is noted that the present invention is not limited to the following embodiments.

1. Actinic Radiation-curable Inkjet Ink

A first embodiment of the present invention is an actinic radiation-curable inkjet ink containing a photocurable compound, a photopolymerization initiator, a crystalline gelling agent and a fluorescent brightener. Herein, the term "actinic radiation-curable inkjet ink" (hereinafter also referred to as the "ink") means an ink composition that can be cured with actinic radiation, and the term "actinic radiation" means rays capable of activating the photopolymerization initiator contained in the ink composition to cure the ink. Examples of the actinic radiation include α-rays, γ-rays, X-rays, ultraviolet rays and electron beams. As the actinic radiation used for curing the ink of the present invention, ultraviolet rays and electron beams are preferably used, and ultraviolet rays are more preferably used from the viewpoint of availability of a radiation emitting apparatus, curability of the ink, and the like.

(1) Photocurable Compound

The photocurable compound is a compound which crosslinks or polymerizes through irradiation with the actinic radiation. The photocurable compound can be a radical polymerizable compound or a cationic polymerizable compound. The photocurable compound is preferably a radical polymerizable compound.

The radical polymerizable compound is a compound (a monomer, an oligomer, a polymer or a mixture of these) having a radical polymerizable ethylenic unsaturated bond. The ink may contain merely one radical polymerizable compound, or may contain two or more of these.

The radical polymerizable compound is a compound (a monomer, an oligomer, a polymer or a mixture of these) having a radical polymerizable ethylenic unsaturated bond. The ink may contain merely one radical polymerizable compound, or may contain two or more of these.

Examples of the compound having a radical polymerizable ethylenic unsaturated bond include unsaturated carboxylic acids and salts thereof, unsaturated carboxylic acid ester compounds, unsaturated carboxylic acid urethane compounds, unsaturated carboxylic acid amide compounds and anhydrides thereof, acrylonitrile, styrene, unsaturated polyester, unsaturated polyether, unsaturated polyamide and unsaturated urethane. Examples of the unsaturated carboxylic acids include (meth)acrylic acid, itaconic acid, crotonic acid, isocrotonic acid and maleic acid.

Among these, the radical polymerizable compound is preferably an unsaturated carboxylic acid ester compound, and is more preferably (meth)acrylate. The (meth)acrylate is not limited to a monomer described later but may be an oligomer, a mixture of a monomer and an oligomer, a modified product, an oligomer having a photocurable functional group or the like.

Herein, the term "(meth)acrylate" embraces an acrylate monomer and/or an acrylate oligomer, and a methacrylate monomer and/or a methacrylate oligomer.

Examples of the (meth)acrylate include monofunctional monomers such as isoamyl (meth)acrylate, stearyl (meth)acrylate, lauryl (meth)acrylate, octyl (meth)acrylate, decyl (meth)acrylate, isomyristyl (meth)acrylate, isostearyl (meth)acrylate, 2-ethyl hexyl-diglycol (meth)acrylate, 2-hydroxybutyl (meth)acrylate, 2-(meth)acryloyloxyethyl hexahydrophthalate, butoxyethyl (meth)acrylate, ethoxy diethylene glycol (meth)acrylate, methoxy diethylene glycol (meth)acrylate, methoxy polyethylene glycol (meth)acrylate, methoxy propylene glycol (meth)acrylate, phenoxyethyl (meth)acrylate, tetrahydrofurfuryl (meth)acrylate, isobornyl (meth)acrylate, 2-hydroxyethyl (meth)acrylate, 2-hydroxypropyl (meth)acrylate, 2-hydroxy-3-phenoxypropyl (meth)acrylate, 2-(meth)acryloyloxyethyl succinate, 2-(meth)acryloyloxyethyl phthalate, 2-(meth)acryloyloxyethyl-2-hydroxyethyl-phthalic acid and t-butylcyclohexyl (meth)acrylate;

difunctional monomers such as triethylene glycol di(meth)acrylate, tetraethylene glycol di(meth)acrylate, polyethylene glycol di(meth)acrylate, tripropylene glycol di(meth)acrylate, polypropylene glycol di(meth)acrylate, 1,4-butanediol di(meth)acrylate, 1,6-hexanediol di(meth)acrylate, 1,9-nonanediol di(meth)acrylate, neopentyl glycol di(meth)acrylate, dimethylol tricyclodecane di(meth)acrylate, bisphenol A PO adduct di(meth)acrylate, neopentyl glycol hydroxypivalate di(meth)acrylate, polytetramethylene glycol di(meth)acrylate, polyethylene glycol diacrylate, tripropylene glycol diacrylate and tricyclodecanedimethanol diacrylate; and tri- or higher-functional monomers such as trimethylolpropane tri(meth)acrylate, pentaerythritol tri(meth)acrylate, pentaerythritol tetra(meth)acrylate, dipentaerythritol hexa(meth)acrylate, ditrimethylolpropane tetra(meth)acrylate, glycerin propoxy tri(meth)acrylate and pentaerythritol ethoxy tetra(meth)acrylate.

The photocurable compound is preferably a polyfunctional compound, and more preferably a polyfunctional (meth)acrylate compound. The polyfunctional (meth)acrylate compound is particularly preferably a propylene oxide-modified (meth)acrylate compound or ethylene oxide-modified (meth)acrylate compound having been modified with propylene oxide or ethylene oxide. The term "modified with propylene oxide or ethylene oxide" as used herein means that at least one repeating unit of propylene oxide or ethylene oxide is introduced into a molecular chain. The number of repeating units of the propylene oxide or the ethylene oxide contained in the propylene oxide-modified (meth)acrylate compound or ethylene oxide-modified (meth)acrylate compound is preferably 1 or more and 14 or less, and more preferably 3 or more and 14 or less per (meth)acrylate group. When the number of the repeating units of the propylene oxide or the ethylene oxide falls in the above-described range, the following effects can be easily obtained.

When the ethylene oxide-modified (meth)acrylate compound or the propylene oxide-modified (meth)acrylate compound is used in combination with a crystalline gelling agent capable of forming a card house structure, the interaction is caused therebetween to easily form a card house structure, and hence a pinning property of the resultant ink becomes very high. Besides, the ethylene oxide-modified (meth)acrylate compound and the propylene oxide-modified (meth)acrylate compound are easily dissolved in another component at a high temperature.

Examples of the ethylene oxide-modified (meth)acrylate compound include polyethylene glycol di(meth)acrylate, ethylene oxide-modified trimethylolpropane tri(meth)acrylate, ethylene oxide-modified pentaerythritol tetra(meth)acrylate, and ethylene oxide-modified hexanediol diacrylate.

Examples of a commercially available product of the ethylene oxide-modified (meth)acrylate compound include 4EO modified hexanediol diacrylate CD561 (molecular weight: 358), 3EO modified trimethylolpropane triacrylate SR454 (molecular weight: 429), 6EO modified trimethylolpropane triacrylate SR499 (molecular weight: 560) and 4EO modified pentaerythritol tetraaciylate SR494 (molecular weight: 529), all manufactured by Sartomer; polyethylene glycol #400 diacrylate (NK ester A-400 (molecular weight: 508)), polyethylene glycol #600 diacrylate (NK ester A-600 (molecular weight: 742)), polyethylene glycol dimethacrylate (NK ester 9G (molecular weight: 536)), and polyethylene glycol dimethacrylate (NK ester 14G (molecular weight: 770)), all manufactured by Shin-Nakamura Chemical Co., Ltd.; and tetraethylene glycol diacrylate (V#335HP (molecular weight: 302)), manufactured by Osaka Organic Chemical Industry Ltd.

Examples of the propylene oxide-modified (meth)acrylate compound include polypropylene glycol di(meth)acrylate, propylene oxide-modified neopentyl glycol di(meth)acrylate, bisphenol A propylene oxide adduct di(meth)acrylate, and glycerin propoxy tri(meth)acrylate.

Examples of a commercially available product of the propylene oxide-modified (meth)acrylate compound include 3PO modified trimethylolpropane triacrylate (Photomer 4072 (molecular weight: 471)), manufactured by Cognis Corporation; dipropylene glycol diacrylate (NK ester APG-100 (molecular weight: 242)), tripropylene glycol diacrylate (NK ester APG-200 (molecular weight: 300)), polypropylene glycol #400 diacrylate (NK ester APG-400 (molecular weight: 533)), and polypropylene glycol #700 diacrylate (NK ester APG-700 (molecular weight: 823)), all manufactured by Shin-Nakamura Chemical Co., Ltd.; and 6PO modified trimethylolpropane triacrylate CD501 (molecular weight: 645), manufactured by Sartomer.

Incidentally, the polyfunctional photocurable compound may be an oligomer obtained by polymerizing any of the (meth)acrylate compounds with a compound having another functional group. Examples of such an oligomer include an epoxy (meth)acrylate oligomer, an aliphatic urethane (meth)acrylate oligomer, an aromatic urethane (meth)acrylate oligomer and a polyester (meth)acrylate oligomer.

The cationic polymerizable compound can be an epoxy compound, a vinyl ether compound, an oxetane compound or the like. The actinic radiation-curable inkjet ink may contain merely one cationic polymerizable compound, or two or more of these.

The epoxy compound is an aromatic epoxide, an alicyclic epoxide, an aliphatic epoxide or the like, and is preferably an aromatic epoxide or an alicyclic epoxide for increasing curability.

The aromatic epoxide can be a di- or poly-glycidyl ether obtained by reacting a polyhydric phenol or an alkylene oxide adduct thereof with epichlorohydrin. Examples of the polyhydric phenol or the alkylene oxide adduct thereof include bisphenol A and an alkylene oxide adduct thereof. An alkylene oxide in the alkylene oxide adduct can be ethylene oxide or propylene oxide.

The alicyclic epoxide can be a cycloalkane oxide-containing compound obtained by epoxidation of a cycloalkane-containing compound with an oxidant such as hydrogen peroxide or peracid. A cycloalkane in the cycloalkane oxide-containing compound can be cyclohexene or cyclopentene.

The aliphatic epoxide can be a di- or poly-glycidyl ether obtained by reacting an aliphatic polyhydric alcohol or an alkylene oxide adduct thereof with epichlorohydrin. Examples of the aliphatic polyhydric alcohol include alkylene glycols such as ethylene glycol, propylene glycol and 1,6-hexandiol. An alkylene oxide in the alkylene oxide adduct can be ethylene oxide, propylene oxide or the like.

Examples of the vinyl ether compound include monovinyl ether compounds such as ethyl vinyl ether, n-butyl vinyl ether, isobutyl vinyl ether, octadecyl vinyl ether, cyclohexyl vinyl ether, hydroxybutyl vinyl ether, 2-ethylhexyl vinyl ether, cyclohexanedimethanol monovinyl ether, n-propyl vinyl ether, isopropyl vinyl ether, isopropenyl ether-o-propylene carbonate, dodecyl vinyl ether, diethylene glycol monovinyl ether and octadecyl vinyl ether; and di- or tri-vinyl ether compounds such as ethylene glycol divinyl ether, diethylene glycol divinyl ether, triethylene glycol divinyl ether, propylene glycol divinyl ether, dipropylene glycol divinyl ether, butanediol divinyl ether, hexanediol divinyl ether, cyclohexanedimethanol divinyl ether and trimethylolpropane trivinyl ether. Among these vinyl ether compounds, a di- or tri-vinyl ether compound is preferred in consideration of the curability and adhesion.

The oxetane compound is a compound having an oxetane ring, and examples include oxetane compounds described in Japanese Patent Application Laid-Open No. 2001-220526, Japanese Patent Application Laid-Open No. 2001-310937 and Japanese Patent Application Laid-Open No. 2005-255821. In particular, examples include a compound represented by general formula (1) described in paragraph 0089 of Japanese Patent Application Laid-Open No. 2005-255821, a compound represented by general formula (2) described in paragraph 0092, a compound represented by general formula (7) described in paragraph 0107, a compound represented by general formula (8) described in paragraph 0109, and a compound represented by general formula (9) described in paragraph 0116 of the same. General formulas (1), (2), (7), (8) and (9) described in Japanese Patent Application Laid-Open No. 2005-255821 are as follows:

[Formula 3]

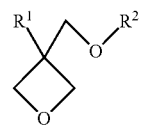

General Formula (1)

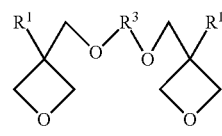

General Formula (2)

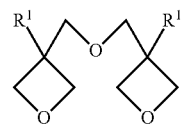

General Formula (7)

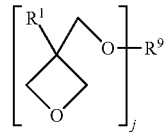

General Formula (8)

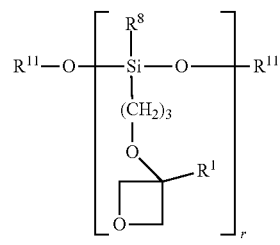

General Formula (9)

A content of the photocurable compound in the actinic radiation-curable inkjet ink is preferably 1 mass % or more and 97 mass % or less, and more preferably 30 mass % or more and 95 mass % or less.

(2) Photopolymerization Initiator

The photopolymerization initiator contains a photo-radical initiator when the photocurable compound is a compound having a radical polymerizable functional group, and contains a photoacid generator when the photocurable compound is a compound having a cationic polymerizable functional group. The ink of the present invention may contain merely one photopolymerization initiator, or may contain two or more of these. The photopolymerization initiator may be a combination of a photo-radical initiator and a photoacid generator.

The photo-radical initiator includes a cleavage type radical initiator and a hydrogen abstraction radical initiator.

Examples of the cleavage type radical initiator include acetophenone-based compounds, benzoin-based compounds, acylphosphine-based compounds, benzyl and methyl phenylglyoxylate.

Examples of the hydrogen abstraction radical initiator include α-aminoketone-based compounds, benzophenone-based compounds, thioxanthone-based compounds, aminobenzophenone-based compounds, 10-butyl-2-chloroacridone, 2-ethylanthraquinone, 9,10-phenanthrenequinone, and camphorquinone.

Examples of the photoacid generator include compounds described in "Organic Materials for Imaging", edited by The Japanese Research Association for Organic Electronics Materials, published by Bunshin-Publishing (1993), pp. 187-192.

A content of the photopolymerization initiator may be in the range which the ink can be sufficiently cured, and the content can be, for example, 0.01 mass % or more and 10 mass % or less with respect to the total mass of the ink of the present invention.

(3) Crystalline Gelling Agent

In the present invention, the gelling agent is defined as "a compound that is an organic matter solid at normal temperature and liquid when heated, and has a function to reversibly cause the ink to undergo sol-gel phase transition according to a temperature", and the crystalline gelling agent is a gelling agent that is crystalized in the ink at a temperature equal to or lower than a gelling temperature. Incidentally, the crystalline gelling agent is a gelling agent having no polymerizable group, and hence is crystalized without being incorporated into a polymer chain formed through polymerization of a photocurable compound.

The crystalline gelling agent has a solidifying mechanism for holding a liquid component in a void of the card house structure in which plate-shaped crystals are physically combined. When the crystalline gelling agent is used as a gelling agent, the pinning property of an ink droplet after landing can be easily increased, and an image can be inhibited from blurring due to spread of the ink droplet.

Examples of the crystalline gelling agent include a ketone wax, an ester wax, a petroleum wax, a vegetable wax, an animal wax, a mineral wax, a hydrogenated castor oil, a modified wax, a higher fatty acid, a higher alcohol, hydroxystearic acid, fatty acid amides including N-substituted fatty acid amide and special fatty acid amide, a higher amine, a sucrose fatty acid ester, a synthetic wax, dibenzylidene sorbitol, dimer acid, and dimer diol.

Examples of the ketone wax include dilignoceryl ketone, dibehenyl ketone, distearyl ketone, dieicosyl ketone, dipalmityl ketone, dilauryl ketone, dimyristyl ketone, myristyl palmityl ketone, and palmityl stearyl ketone.

Examples of the ester wax include behenyl behenate, icosyl icosanoate, stearyl stearate, palmityl stearate, cetyl palmitate, myristyl myristate, cetyl myristate, myristyl cerotate, oleyl palmitate, glycerin fatty acid ester, sorbitan fatty acid ester, propylene glycol fatty acid ester, ethylene glycol fatty acid ester, and polyoxyethylene fatty acid ester.

Examples of a commercially available product of the glycerin fatty acid ester include POEM series, manufactured by Riken Vitamin Co., Ltd., and SY Glyster series, manufactured by Sakamoto Yakuhin Kogyo Co., Ltd.

Examples of a commercially available product of the sorbitan fatty acid ester include NIKKOLSS series, manufactured by Nikko Chemicals Co., Ltd.

An example of a commercially available product of the propylene glycol fatty acid ester includes EMALEX PG-di-S, manufactured by Nihon Emulsion Co., Ltd.

Examples of a commercially available product of the ethylene glycol fatty acid ester include EMALEX EG-di-SE, EMALEX DEG-di-SE, EMALEX EG-di-S, EMALEX EG-di-L and EMALEX EG-di-O, manufactured by Nihon Emulsion Co., Ltd.

Examples of a commercially available product of the polyoxyethylene glycol fatty acid ester include EMALEX SWS, EMALEX CWS, EMALEX GWS and EMALEX LWS, manufactured by Nihon Emulsion Co., Ltd.

Examples of the petroleum wax include a paraffin wax, a microcrystalline wax, and a petrolactam.

Examples of the vegetable wax include a candelilla wax, a carnauba wax, a rice wax, a Japan wax, a jojoba oil, a jojoba solid wax, and a jojoba ester.

Examples of the animal wax include a beeswax, a lanolin, and a spermaceti.

Examples of the mineral wax include montan wax and hydrogenated wax.

Examples of the modified wax include a montan wax derivative, a paraffin wax derivative, a microcrystalline wax derivative, a 12-hydroxystearate derivative, and a polyethylene wax derivative.

Examples of the higher fatty acid include behenic acid, arachidic acid, stearic acid, palmitic acid, myristic acid, lauric acid, oleic acid, and erucic acid.

Examples of the higher alcohol include stearyl alcohol and behenyl alcohol.

An example of the hydroxystearic acid includes 12-hydroxystearic acid.

Examples of the fatty acid amides include lauric acid amide, stearic acid amide, behenic acid amide, oleic acid amide, erucic acid amide, ricinoleic acid amide, and 12-hydroxystearic acid amide.

Examples of a commercially available product of the fatty acid amide include NIKKAMIDE series, manufactured by Nippon Kasei Chemical Co., Ltd. ("NIKKAMIDE" being their registered trademark), ITOWAX series, manufactured by Ito Oil Chemicals Co., Ltd., and FATTY AMID series, manufactured by Kao Corporation.

Examples of the N-substituted fatty acid amide include N-stearyl stearic acid amide, and N-oleyl palmitic acid amide.

Examples of the special fatty acid amide include N,N'-ethylenebis stearyl amide, N,N'-ethylenebis-12-hydroxy stearyl amide, and N,N'-xylylenebis stearyl amide.

Examples of the higher amine include dodecylamine, tetradecylamine, and octadecylamine.

Examples of the sucrose fatty acid ester include sucrose stearate and sucrose palmitate.

Examples of a commercially available product of the sucrose fatty acid ester include RYOTO sugar ester series ("RYOTO" being their registered trademark) manufactured by Mitsubishi-Chemical Foods Corporation.

Examples of the synthetic wax include a polyethylene wax, and an α-olefin maleic anhydride copolymer wax.

Examples of a commercially available product of the synthetic wax include UNILIN series ("UNILIN" being their registered trademark) manufactured by Baker-Petrolite.

An example of the dibenzylidene sorbitol includes 1,3:2,4-bis-O-benzylidene-D-glucitol.

An example of a commercially available product of the dibenzylidene sorbitol includes GEL ALL D ("GEL ALL" being their registered trademark) manufactured by New Japan Chemical Co., Ltd.

Examples of a commercially available product of the dimer diol include PRIPOR series ("PRIPOR" being their registered trademark) manufactured by CRODA.

Among these gelling agents, from the viewpoint of further increasing the pinning property, a ketone wax, an ester wax, a higher fatty acid, a higher alcohol and a fatty acid amide are preferred.

The actinic radiation-curable inkjet ink may contain merely one crystalline gelling agent, or may contain two or more crystalline gelling agents together.

The gelling agent preferably includes a straight chain hydrocarbon group having 9 or more and 25 or less carbon atoms, and thus the "card house structure" can be easily formed. The gelling agent may have a branched chain in its structure.

Specific examples of the gelling agent including a straight chain hydrocarbon group having 9 or more and 25 or less carbon atoms include aliphatic ketone compounds, aliphatic ester compounds, higher fatty acids, higher alcohols and fatty acid amides each having a straight chain hydrocarbon group having 9 or more and 25 or less carbon atoms.

The gelling agent is preferably an aliphatic ketone compound or an aliphatic ester compound. In other words, it is preferably a compound represented by the following general formula (G1) or (G2):

  General formula (G1):

  General formula (G2):

In general formulas (G1) and (G2), $R_9$ to $R_{12}$ each independently preferably represent a straight chain or branched chain hydrocarbon group having 9 or more and 25 or less carbon atoms.

The compound represented by general formula (G1) or (G2) has faint color of the material itself, and furthermore, when combined with the fluorescent brightener to produce an ink, a cured film in which change in color otherwise caused by the fluorescent brightener is difficult to occur is probably formed owing to its gel characteristics.

The hydrocarbon group represented by $R_9$ or $R_{10}$ in general formula (G1) is not especially limited, and is preferably a hydrocarbon group including a straight chain portion having 9 or more and 25 or less carbon atoms.

Examples of the aliphatic ketone compound represented by general formula (G1) include 18-pentatriacontanone (number of carbons: 17-17), dilignoceryl ketone (number of carbons: 24-24), dibehenyl ketone (number of carbons: 22-22), distearyl ketone (number of carbons: 18-18), dieicosyl ketone (number of carbons: 20-20), dipalmityl ketone (number of carbons: 16-16), dimyristyl ketone (number of carbons: 14-14), dilauryl ketone (number of carbons: 12-12), lauryl myristyl ketone (number of carbons: 12-14), lauryl palmityl ketone (number of carbons: 12-16), myristyl palmityl ketone (number of carbons: 14-16), myristyl stearyl ketone (number of carbons: 14-18), myristyl behenyl ketone (number of carbons: 14-22), palmityl stearyl ketone (number of carbons: 16-18), palmityl behenyl ketone (number of carbons: 16-22) and stearyl behenyl ketone (number of carbons: 18-22). It is noted that the number of carbons in parentheses correspond to number of carbons (the number of carbon atoms) of two hydrocarbon groups divided by a carbonyl group.

Examples of a commercially available product of the compound represented by general formula (G1) include 18-Pentatriacontanon (manufactured by Alfa Aeser), Hentriacontan-16-on (manufactured by Alfa Aeser) and Kao Wax T1 (manufactured by Kao Corporation). The ink may contain merely one aliphatic ketone compound, or may contain a mixture of two or more of these.

The hydrocarbon group represented by $R_{11}$ or $R_{12}$ in general formula (G2) is not especially limited, and is preferably a hydrocarbon group including a straight chain portion having 9 or more and 25 or less carbon atoms.

Examples of the aliphatic ester compound represented by general formula (G2) include behenyl behenate (number of carbonsnumber of carbons: 21-22), icosyl icosanoate (carbon numbers: 19-20), stearyl stearate (number of carbons: 17-18), palmityl stearate (number of carbons: 17-16), lauryl stearate (number of carbons: 17-12), cetyl palmitate (number of carbons: 15-16), stearyl palmitate (C15-18), myristyl myristate (number of carbons: 13-14), cetyl myristate (number of carbons: 13-16), octyldodecyl myristate (number of carbons: 13-20), stearyl oleate (number of carbons: 17-18), stearyl erucate (number of carbons: 21-18), stearyl linoleate (number of carbons: 17-18), behenyl oleate (number of carbons: 18-22), myricyl cerotate (number of carbons: 25-16) and arachidyl linoleate (number of carbons: 17-20). It is noted that the number of carbons in parentheses correspond to number of carbons of two hydrocarbon groups divided by an ester group.

Examples of a commercially available product of the aliphatic ester compound represented by general formula (G2) include UNISTER M-2222SL (manufactured by NOF Corporation), UNISTER-M-9796 (manufactured by NOF Corporation), Exceparl SS (manufactured by Kao Corporation), EMALEX CC-18 (manufactured by Nihon Emulsion Co., Ltd.), AMREPS PC (manufactured by Kokyu Alcohol Kogyo Co., Ltd.), Exceparl MY-M (manufactured by Kao Corporation), SPERMACETI (manufactured by NOF Corporation) and EMALEX CC-10 (manufactured by Nihon Emulsion Co., Ltd.). Many of these commercially available products are mixtures of two or more components, and hence, they may be separated and refined if necessary.

The ink may contain merely one of the aliphatic ester compounds, or may contain a mixture of two or more of these.

A content of the crystalline gelling agent in the ink is preferably 1 mass % or more and 10 mass % or less, more preferably 1 mass % or more and 7 mass % or less, and further preferably 1 mass % or more and 3 mass % or less with respect to the total mass of the ink. When the content is 1 mass % or more, the effects of the gelling agent such as the improvement of the pinning property are exhibited, and when the content is 10 mass % or less, the glossiness of an image to be formed can be improved when used together with the fluorescent brightener.

When the ink contains no amorphous gelling agent having a polymerizable group, the effect of improving the glossiness owing to the fluorescent brightener can be further increased. The term "substantially" means that a content of an amorphous gelling agent is less than 0.1 mass % with respect to the total content of the gelling agent.

(4) Fluorescent Brightener

In the present invention, the fluorescent brightener is a compound that has been conventionally used as one of fluorescent dyes. The physical principle and chemistry of the fluorescent brightener are described in Ullmann's Encyclopedia of Industrial Chemistry, Sixth Edition, Electronic Release, Wiley-VCH 1998.

The fluorescent brightener used in the present invention is not especially limited, and any fluorescent brightener can be used as long as it is crystallized under a condition for curing the ink. Specific examples of the fluorescent brightener include a benzoxazole-based compound, a coumarin-based compound, a styrene biphenyl-based compound, a pyrazolone-based compound, a stilbene-based compound, a styryl derivative of benzene and biphenyl, a bis(benzazole-2-yl) derivative, carbostyril, naphthalimide, a derivative of dibenzothiophene-5,5'-dioxide, a pyrene derivative and pyridotriazole. One of these may be used singly, or two or more of these may be used in combination.

The fluorescent brightener used in the present invention is preferably a benzoxazole-based compound represented by the following general formula (1). It is known that a fluorescent brightener causes yellowish coloring due to its light absorbing property. It is also known that it exhibits, due to its fluorescence emitting property, light source-dependence that the color of an image looks different depending on light emitted in a place where the image is seen (for example, whether the light is outdoor sunlight or light of an indoor fluorescent lamp). Since the benzoxazole-based compound is lower in the coloring property as compared with the coumarin-based compound or the stilbene-based compound, there is a lower possibility of affecting the color of the ink when used in a preferable amount of use described below, and coloring of an image can be also reduced, and therefore, it is preferable as the fluorescent brightener used in the ink of the present invention.

[Formula 4]

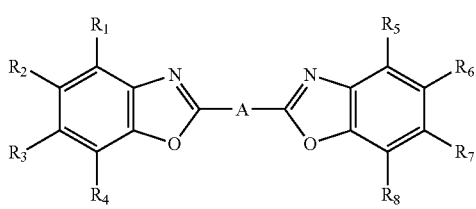

(1)

wherein $R_1$ to $R_8$ each independently represent a hydrogen atom or an alkyl group, and A represents a linking group represented by any one of the following formulas (2) to (5):

[Formula 5]

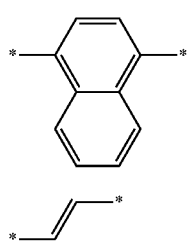

(2)

(3)

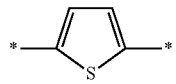

(4)

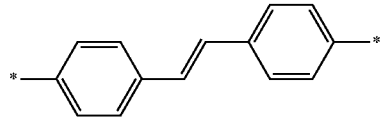

(5)

wherein each * represents a bonding position of A of each formula.

In general formula (1), $R_1$ to $R_8$ each independently represent a hydrogen atom or an alkyl group. Examples of the alkyl group include straight, branched or cyclic alkyl groups having 1 to 10 carbon atoms. The alkyl group may be substituted, and examples of a substituent used here include a group containing a carbon atom, such as a carboxyl group or an alkoxy group, a hydroxyl group, and a halogen atom.

The compound represented by general formula (1) has high solubility in the gel ink, and starts to be crystallized when the photocurable compound starts to be cured, and therefore, the crystal of the gelling agent can be effectively made fine. In particular, a compound represented by general formula (1) wherein A has a structure represented by formula (4) is suitably used because it little affects the color tone of the ink and change in color is difficult to be visually recognized in comparison with another ink not containing the fluorescent brightener.

Examples of a commercially available product of the benzoxazole-based compound represented by general formula (1) include FLUORESCENT BRIGHTENER KCB (manufactured by Xcolor Pigment) in which A in general formula (1) has the structure of formula (2), FLUORESCENT BRIGHTENER PF (manufactured by Xcolor Pigment) in which A in general formula (1) has the structure of formula (3), FLUORESCENT BRIGHTENER OB and FLUORESCENT BRIGHTENER PB (both manufactured by Xcolor Pigment) in which A in formula (1) has the structure of formula (4), and FLUORESCENT BRIGHTENER OB-1 and FLUORESCENT BRIGHTENER KSN (both manufactured by Xcolor Pigment) in which A in formula (1) has the structure of formula (5).

A content of the fluorescent brightener is preferably 0.01 mass % or more and 1.0 mass % or less, more preferably 0.05 mass % or more and 0.5 mass % or less, and further preferably 0.05 mass % or more and 0.2 mass % or less with respect to the total mass of the actinic radiation-curable inkjet ink. In order to increase the glossiness of a resultant image without causing coloring with the fluorescent brightener or the light source-dependent color change, the amount of the fluorescent brightener to be used preferably falls in the above-described range. Specifically, when the content of the fluorescent brightener is 0.01 mass % or more, the effect of making the crystal of the gelling agent fine is exhibited so that the glossiness of a resultant image can be increased, and when the content of the fluorescent brightener is 1.0 mass % or less, there is no fear of coloring with the fluorescent brightener. Besides, when the ink is a color ink, the influence on the color tone of the cured film can be reduced.

(5) Additional Components

The ink of the present invention may further contain other components including a colorant, a photopolymerization initiator auxiliary agent, a polymerization inhibitor and the like. The ink of the present invention may contain merely one of these components, or two or more of these.

The colorant can be a dye or a pigment, and a pigment is preferably used because a pigment has good dispersibility in the components of the ink and is excellent in weather resistance. The pigment is not especially limited, and can be, for example, any of organic pigments or inorganic pigments of the following numbers listed in Color Index:

Examples of red or magenta pigments include Pigment Red 3, 5, 19, 22, 31, 38, 43, 48:1, 48:2, 48:3, 48:4, 48:5, 49:1, 53:1, 57:1, 57:2, 58:4, 63:1, 81, 81:1, 81:2, 81:3, 81:4, 88, 104, 108, 112, 122, 123, 144, 146, 149, 166, 168, 169, 170, 177, 178, 179, 184, 185, 208, 216, 226, 257, Pigment Violet 3, 19, 23, 29, 30, 37, 50, 88, Pigment Orange 13, 16, 20, 36, and a mixture thereof.

Examples of blue or cyan pigments include Pigment Blue 1, 15, 15:1, 15:2, 15:3, 15:4, 15:6, 16, 17:1, 22, 27, 28, 29, 36, 60, and a mixture thereof.

Examples of green pigments include Pigment Green 7, 26, 36, 50, and a mixture thereof. Examples of yellow pigments include Pigment Yellow 1, 3, 12, 13, 14, 17, 34, 35, 37, 55, 74, 81, 83, 93, 94, 95, 97, 108, 109, 110, 137, 138, 139, 153, 154, 155, 157, 166, 167, 168, 180, 185, 193, and a mixture thereof.

Examples of black pigments include Pigment Black 7, 28, 26, and a mixture thereof.

Examples of commercially available products of the pigments include Chromofine Yellow 2080, 5900, 5930, AF-1300, 2700L, Chromofine Orange 3700L, 6730, Chromofine Scarlet 6750, Chromofine Magenta 6880, 6886, 6891N, 6790, 6887, Chromofine Violet RE, Chromofine Red 6820, 6830, Chromofine Blue HS-3, 5187, 5108, 5197, 5085N, SR-5020, 5026, 5050, 4920, 4927, 4937, 4824, 4933GN-EP, 4940, 4973, 5205, 5208, 5214, 5221, 5000P, Chromofine Green 2GN, 2GO, 2G-550D, 5310, 5370, 6830, Chromofine Black A-1103, SEIKAFAST YELLOW 10GH, A-3, 2035, 2054, 2200, 2270, 2300, 2400(B), 2500, 2600, ZAY-260, 2700(B), 2770, SEIKAFAST RED 8040, C405 (F), CA 120, LR-116, 1531B, 8060R, 1547, ZAW-262, 1537B, GY, 4R-4016, 3820, 3891, ZA-215, SEIKAFAST CARMINE 6B1476T-7, 1483LT, 3840, 3870, SEIKAFAST BORDEAUX 10B-430, SEIKALIGHT ROSE R40, SEIKALIGHT VIOLET B 800, 7805, SEIKAFAST MAROON 460N, SEIKAFAST ORANGE 900, 2900, SEIKALIGHT BLUE C 718, A 612, Cyanine Blue 4933M, 4933GN-EP, 4940, 4973 (from Dainichiseika Color & Chemicals Mfg. Co., Ltd.); KET Yellow 401, 402, 403, 404, 405, 406, 416, 424, KET Orange 501, KET Red 301, 302, 303, 304, 305, 306, 307, 308, 309, 310, 336, 337, 338, 346, KET Blue 101, 102, 103, 104, 105, 106, 111, 118, 124, KET Green 201 (from Dainippon Ink & Chemicals Inc.); Colortex Yellow 301, 314, 315, 316, P-624, 314, U10GN, U3GN, UNN, UA-414, U263, Finecol Yellow T-13, T-05, Pigment Yellow 1705, Colortex Orange 202, Colortex Red 101, 103, 115, 116, D3B, P-625, 102, H-1024, 105C, UFN, UCN, UBN, U3BN, URN, UGN, UG276, U456, U457, 105C, USN, Colortex Maroon 601, Colortex Brown B610N, Colortex Violet 600, Pigment Red 122, Colortex Blue 516, 517, 518, 519, A818, P-908, 510, Colortex Green 402, 403, Colortex Black 702, U905 (from Sanyo Color Works, Ltd.); Lionol Yellow 1405G, Lionol Blue FG7330, FG7350, FG7400G, FG7405G, ES, ESP-S (from Toyo Ink Co., Ltd.); Toner Magenta E 02, Permanent Rubin F6B, Toner Yellow HG, Permanent Yellow GG-02, Hostaperm Blue B2G (from Hoechst AG); Novoperm P-HG, Hostaperm Pink E, Hostaperm Blue B2G (from Clariant); Carbon Black #2600, #2400, #2350, #2200, #1000, #990, #980, #970, #960, #950, #850, MCF 88, #750, #650, MA600, MA7, MA8, MA11, MA100, MA100R, MA77, #52, #50, #47, #45, #45L, #40, #33, #32, #30, #25, #20, #10, #5, #44, and CF9 (from Mitsubishi Chemical Corporation).

A volume average particle size of a pigment particle contained in the ink is preferably 0.08 to 0.5 μm, and a maximum particle size thereof is preferably 0.3 to 10 μm, and more preferably 0.3 to 3 μm.

A content of the colorant is preferably 0.1 mass % or more and 20 mass % or less, and more preferably 0.4 mass % or more and 10 mass % or less with respect to the total mass of the ink.

Besides, if the ink contains the pigment, the ink may contain a pigment dispersant for dispersing the pigment. If the ink contains a pigment dispersant, the dispersibility of the pigment is improved.

The ink of the present invention may further contain a dispersing auxiliary agent if necessary. As the dispersing auxiliary agent, any of known compounds is appropriately selected in accordance with the pigment. A content of the pigment dispersant and the dispersing auxiliary agent is preferably 1 to 50 mass % with respect to the total mass of the pigment.

The photopolymerization initiator auxiliary agent can be a tertiary amine compound, and is particularly preferably an aromatic tertiary amine compound. Examples of the aromatic tertiary amine compound include N,N-dimethylaniline, N,N-diethylaniline, N,N-dimethyl-p-toluidine, ethyl N,N-dimethylamino-p-benzoate, isoamylethyl N,N-dimethylamino-p-benzoate, N,N-dihydroxyethyl aniline, triethylamine and N,N-dimethylhexylamine. Among these, ethyl N,N-dimethylamino-p-benzoate and isoamylethyl N,N-dimethylamino-p-benzoate are preferably used. The ink of the present invention may contain merely one of these photopolymerization initiator auxiliary agents, or two or more of these. An example of a commercially available product of the photopolymerization initiator auxiliary agent includes SPEEDCURE 7040, manufactured by Lamb son.

A content of the photopolymerization initiator auxiliary agent is preferably 0.1 mass % or more and 5 mass % or less with respect to the total mass of the ink. If the amount of the photopolymerization initiator auxiliary agent falls in the above-described range, the curability of the ink becomes good.

Examples of the polymerization inhibitor include (alkyl) phenol, hydroquinone, catechol, resorcin, p-methoxyphenol, t-butylcatechol, t-butylhydroquinone, pyrogallol, 1,1-picrylhydrazyl, phenothiazine, p-benzoquinone, nitrosobenzene, 2,5 di-t-butyl-p-benzoquinone, dithiobenzoyl disulfide, picric acid, cupferron, aluminum N-nitrosophenylhydroxylamine, tri-p-nitrophenylmethyl, N-(3-oxyanilino-1,3-dimethylbutylidene)aniline oxide, dibutyl cresol, cyclohexanone oxime cresol, guaiacol, o-isopropylphenol, butyraldoxime, methyl ethyl ketoxime, and cyclohexanone oxime. An example of a commercially available product of the polymerization inhibitor includes Irgastab UV10, manufactured by BASF Corporation.

A content of the polymerization inhibitor is preferably 0.001 mass % or more and 0.2 mass % or less with respect to the total mass of the ink. If the amount of the polymerization inhibitor falls in this range, the resultant ink attains good storage stability.

Besides, the ink of the present invention may contain a ultraviolet absorber, an antioxidant or the like from the viewpoint of improving the weather resistance of the cured film. Any of known compounds can be used as the ultraviolet absorber, and from the viewpoint of the weather resistance and ozone resistance, one having the longer wavelength end of the absorption wavelength of 410 nm or less is preferably used. The absorption wavelength of the ultraviolet absorber can be obtained by measuring a ultraviolet and visible absorption spectrum. A content of the ultraviolet absorber is preferably 2 mass % or less, more preferably 1 mass % or less, and further preferably 0.5 mass % or less with respect to the total mass of the ink from the viewpoint of the curability. On the other hand, from the viewpoint of absorbing irradiated ultraviolet rays to increase light resistance of the cured film, the content of the ultraviolet absorber is preferably 0.1 mass % or more with respect to the total mass of the ink.

As the antioxidant, any of known compounds can be also used, and from the viewpoint of the curability, a content thereof is preferably 0.8 mass % or less, and more preferably 0.5 mass % or less with respect to the total mass of the ink. On the other hand, from the viewpoint of capturing a radical generated in the cured film of the ink to sufficiently inhibit oxidation of the cured film, the content of the antioxidant is preferably 0.05 mass % or more with respect to the total mass of the ink.

Besides, the content of the ultraviolet absorber and the antioxidant is preferably 2.0 mass % or less, and more preferably 1.0 mass % or less with respect to the total mass of the ink from the viewpoint of discharging stability and the curability of the ink.

The ink of the present invention may further contain any of various additives and resins in addition to those described above if necessary. Examples of the various additives include a surfactant, a leveling additive, a matting agent, an infrared absorber, an antibacterial agent, and a basic compound for improving the storage stability of the ink. Examples of the basic compound include basic alkali metal compounds, basic alkali earth metal compounds, and basic organic compounds such as amine.

A content of the various additives such as a surfactant is preferably 1 mass % or less, and more preferably 0.5 mass % or less with respect to the total mass of the ink from the viewpoint of making the gelling agent and the fluorescent brightener easily crystallized.

Example of the additional resins include resins for adjusting the physical properties of the cured film, and examples include a polyester-based resin, a polyurethane-based resin, a vinyl-based resin, an acrylic-based resin and a rubber-based resin.

(6) Physical Properties

In order to further increase an ink discharging property from an inkjet head, the ink of the present invention has a viscosity at 80° C. of preferably 3 mPa·s or more and 20 mPa·s or less. Besides, from the viewpoint of sufficiently gelling the ink caused to land and cooled to normal temperature, the ink of the present invention has a viscosity at 25° of preferably 1,000 mPa·s or more.

A gelling temperature of the ink of the present invention is preferably 40° C. or more and less than 100° C. If the gelling temperature of the ink is 40° C. or more, the ink is rapidly gelled after the landing on a substrate, and hence the pinning property further increases. If the gelling temperature of the ink is less than 100° C., the ink having been gelled by heating can be discharged from the inkjet head, and hence the ink can be more stably discharged. From the viewpoint of reducing the load on an image forming apparatus for making the ink dischargeable at a lower temperature, the gelling temperature of the ink of the present invention is more preferably 40° C. or more and less than 70° C.

The viscosity at 80° C., the viscosity at 25° C. and the gelling temperature of the ink of the present invention can be obtained by measuring, with a rheometer, change, with temperature, of dynamic viscoelasticity of the ink. In the present invention, these viscosities and the gelling temperature are obtained by the following methods: The ink of the present invention is heated to 100° C., and while measuring its viscosity with a stress-controlled rheometer, Physica MCR301 (diameter of cone plate: 75 mm, cone angle: 1.0°), manufactured by Anton Paar, the ink is cooled to 20° C. under conditions of a shear rate of 11.7 (l/s) and a cooling rate of 0.1° C./s, and thus, a viscosity-temperature curve is obtained. The viscosity at 80° C. and the viscosity at 25° C. can be obtained reading viscosities at 80° C. and 25° C. on the viscosity-temperature curve. The gelling temperature can be obtained as a temperature at which the viscosity is 200 mPa·s on the viscosity-temperature curve.

From the viewpoint of further increasing a discharging property from an inkjet head, when the ink of the present invention contains a pigment, an average particle size of a pigment particle is preferably 0.08 μm or more and 0.5 μm or less, and a maximum particle size is preferably 0.3 μm or more and 10 μm or less. The average particle size of a pigment particle herein means a value obtained by a dynamic light scattering method using Zetasizer Nano ZSP, manufactured by Malvern Instruments. Incidentally, since an ink containing a colorant has such a high concentration that light is not transmitted therethrough in using this measuring apparatus, the ink is diluted 200 times before the measurement. A measurement temperature is set to normal temperature (25° C.).

2. Image Forming Method

A second embodiment of the present invention is an image forming method using the ink of the present invention.

The image forming method of the present invention can be carried out in the same manner as a known image forming method in which an ink is discharged from an inkjet head to land and be cured on a substrate except that the above-described actinic radiation-curable inkjet ink is used.

The image forming method of the present invention includes, for example, a first step of causing the above-described ink to be ejected from a nozzle of an inkjet head and to land on a substrate; and a second step of curing the ink by irradiating the ink thus caused to land with actinic radiation.

(1) First Step

In the first step, a droplet of the ink is discharged from the inkjet head, so as to cause the droplet to land on a substrate in a position according to an image to be formed.

As a discharging method from the inkjet head, either of a drop-on-demand method or a continuous method may be employed. In employing the drop-on-demand method, the inkjet head may be any one of a single cavity type, a double cavity type, a vendor type, a piston type, an electrical/mechanical conversion system such as a share mode type or a shared wall type, and an electrical/thermal conversion system such as a thermal inkjet type or a bubble-jet type ("bubble-jet" being a registered trademark of Canon Inc.).

Discharging stability of the ink droplet can be increased by discharging the droplet in a heated state from the inkjet head. The temperature of the ink in discharging is preferably 35° C. or more and 100° C. or less, and for further increasing the discharging stability, is more preferably 35° C. or more and 80° C. or less. In particular, the droplet is preferably ejected at an ink temperature at which the viscosity of the ink is 7 mPa·s or more and 15 mPa·s or less, and more preferably 8 mPa·s or more and 13 mPa·s or less.

In order to improve an ejecting property of the ink from a discharge recording head, the temperature of the ink filled in the discharge recording head is preferably set to a range from [the gelling temperature of the ink +10° C.] to [the gelling temperature +30° C.]. If the temperature of the ink held in the discharge recording head is lower than [the gelling temperature +10° C.], the ink tends to be gelled within the discharge recording head or on a surface of a nozzle to lower the ejecting property of the ink. On the other hand, if the temperature of the ink held in the discharge recording head exceeds [the gelling temperature +30° C.], the temperature of the ink is so high that the ink components may be degraded.

A method for heating the ink to a prescribed temperature is not especially limited. For example, at least any one of an ink tank included in a head carriage, an ink supply system such as a supply pipe or an anterior chamber immediately before a head, a pipe with a filter, and a piezo head can be heated to a prescribed temperature by using any one of a panel heater, a ribbon heater, heating water and the like.

The amount of the droplet of the ink to be discharged is preferably 2 pL or more and 20 pL or less from the viewpoint of a recording rate and an image quality.

The substrate is not especially limited, and general paper such as non-coated paper and coated paper, synthetic paper Yupo, various plastics used for soft packaging and films thereof can be used. Examples of the various plastic films include a PP film, a PET film, an OPS film, an OPP film, an ONy film, a PVC film, a PE film and a TAC film. Examples of other plastics include polycarbonate, an acrylic resin, ABS, polyacetal, PVA and rubbers. Alternatively, a metal or a glass is applicable. Incidentally, the ink of the present invention is capable of forming an image with higher glossiness than a conventional ink, and therefore, coated paper or the like with comparatively high glossiness is suitably used.

The temperature of the substrate at the time of the ink droplet landing is preferably controlled to 20° C. or more and 40° C. or less from the viewpoint of the gelation of the ink.

(2) Second Step

In the second step, the ink caused to land in the second step is irradiated with actinic energy radiation to form an image by curing the ink. The actinic energy radiation is irradiated preferably within 0.001 seconds or more and 1.0 second or less after the landing of the ink, and for forming a high resolution image, more preferably within 0.001 seconds or more and 0.5 seconds or less.

The actinic energy radiation used for irradiating the ink can be selected from, for example, electron beams, ultraviolet rays, α-rays, γ-rays and X-rays, and among these, ultraviolet rays are preferably used for the irradiation. The ultraviolet rays can be irradiated, for example, using a water-cooled LED of 395 nm, manufactured by Phoseon Technology, Inc. When an LED is used as a light source, occurrence of ink curing failure otherwise caused because the ink is melted by radiant heat of the light source can be suppressed.

The LED light source is installed so that peak illuminance of the ultraviolet rays of a wavelength of 370 nm or more and 410 nm or less on an image surface can be 0.5 W/cm$^2$ or more and 10 W/cm$^2$ or less, and more preferably 1 W/cm$^2$ or more and 5 W/cm$^2$ or less. From the viewpoint of suppressing the radiant heat irradiating the ink, the amount of radiation used for irradiating an image is preferably less than 350 mJ/cm$^2$.

Besides, the irradiation with the actinic energy radiation can be carried out in two steps as follows: First, the actinic energy radiation is irradiated as described above within 0.001 seconds or more and 2.0 seconds or less after the landing of the ink for temporarily curing the ink, and after completing the irradiation for the whole image, the actinic energy radiation is further irradiated so as to finally cure the ink. If the irradiation with the actinic energy radiation is thus carried out in the two steps, shrinkage of a recording material, which may occur in curing the ink, can be further suppressed.

In the image forming method of the present invention, if a total ink thickness obtained after curing the ink caused to land on the substrate through the irradiation with the actinic energy radiation is 2 μm or more and 20 μm or less, occurrence of curl and wrinkle of the substrate, change in texture of the substrate, and the like can be more efficiently prevented. It is noted that the term "total ink thickness" means a sum of thicknesses of all inks applied or printed on the substrate, or an average value of the thicknesses measured in a plurality of points where the amount of ink caused to land is estimated to be large.

EXAMPLES

The present invention will now be described with reference to examples, and it is noted that the present invention is not limited to these examples. Incidentally, the term "part" or "%" used in the examples means "part by mass" or "mass %" unless otherwise defined.

1. Preparation of Ink 1-1. Preparation of Cyan Pigment Dispersion

A cyan pigment dispersion was prepared as follows:

A stainless steel beaker was charged with 9 mass % of EFKA4130 (manufactured by BASF Corporation) used as a pigment dispersant, and 71 mass % of tricyclodecanedimethanol diacrylate (A-DCP: manufactured by Shin-Nakamura Chemical Co., Ltd.) used as a polyfunctional photocurable compound, and the resultant was stirred for 1 hour with heating on a hot plate at 65° C.

The thus obtained mixture was cooled to room temperature, and 20 mass % of Pigment Blue 15:4 (manufactured by Dainichiseika Color & Chemicals Mfg. Co., Ltd.) used as a pigment was added thereto. The resultant solution was put in a glass bottle together with 200 g of zirconia beads having a diameter of 0.5 mm, and the glass bottle was tightly sealed and subjected to a dispersion treatment with a paint shaker for 5 hours. Thereafter, the zirconia beads were removed to obtain a cyan pigment dispersion.

1-2. Preparation of Ink

In accordance with ink components shown in Tables 1 to 7 below, the above-described pigment dispersion was mixed with the following components, and the resultant was heated to 80° C. and stirred. The thus obtained mixture was filtered, with heating, through a Teflon® 3 μm-membrane filter manufactured by ADVANTEC Co., Ltd. to obtain each of ink samples 1 to 36. It is noted that the amount of each component shown in tables is in mass %.

(Ink Materials)

[Photocurable Compound]

(Monofunctional Photocurable Compound)

Tetrahydrofurfuryl acrylate (THFA) (V#150: manufactured by Osaka Organic Chemical Industry Ltd.)

(Polyfunctional Photocurable Compound)
3PO modified trimethylolpropane triacrylate (3PO-TMPTA) (Photomer 4072: manufactured by Cognis Corporation)
3-Methylpentanediol diacrylate (MPDDA)
2-(2-Vinyloxyethoxy)ethyl acrylate (VEEA: manufactured by Nippon Shokubai Co., Ltd.)
Polyethylene glycol #400 diacrylate (PEG400DA) (MK ester A-600: manufactured by Shin-Nakamura Chemical Co., Ltd.)
6EO modified trimethylolpropane triacrylate (6EO-TMPTA) (SR499: manufactured by SARTOMER)
4EO modified pentaerythritol tetraacrylate (4EO-PETTA) (SR494: manufactured by SARTOMER)
PO modified neopentyl glycol diacrylate (PO-NPGDA)
[Photopolymerization Initiator]
(α-Aminoketone-based Compound)
IRGACURE 369 (manufactured by BASF Corporation)
IRGACURE 907 (manufactured by BASF Corporation)
(Acylphosphine-based Compound)
DAROCURE TPO (manufactured by BASF Corporation)
IRGACURE 819 (manufactured by BASF Corporation)
(Thioxanthone-based Compound)
SPEEDCURE ITX (manufactured by Lambson)
[Gelling Agent]
Lauric acid amide (DIAMID Y: manufactured by Nippon Kasei Chemical Co., Ltd, carbon number: 12) Ethylene glycol distearate (EMALEX EG-di-S: manufactured by Nihon Emulsion Co., Ltd., number of carbons: 17-17)
Stearyl stearate (Exceparl SS: manufactured by Kao Corporation, number of carbons: 17-18)
Distearyl ketone (Kao Wax T1: manufactured by Kao Corporation, number of carbons: 18-18)
[Fluorescent Brightener]
(Coumarin-based Compound)
Hakkol P (manufactured by Showa Chemical Industry Co., Ltd.)
(Stilbene-based Compound)
FLUORESCENT BRIGHTENER FP-127 (manufactured by Xcolor Pigment)
FLUORESCENT BRIGHTENER OBK (manufactured by Xcolor Pigment)
(Benzoxazole-based compound represented by general formula (1))
FLUORESCENT BRIGHTENER OB (manufactured by Xcolor Pigment) (in which A in general formula (1) has the structure of formula (4))
FLUORESCENT BRIGHTENER OB-1 (manufactured by Xcolor Pigment) (in which A in general formula (1) has the structure of formula (5))
FLUORESCENT BRIGHTENER PF (manufactured by Xcolor Pigment) (in which A in general formula (1) has the structure of formula (3))
FLUORESCENT BRIGHTENER PB (manufactured by Xcolor Pigment) (in which A in general formula (1) has the structure of formula (4))
FLUORESCENT BRIGHTENER KCB (manufactured by Xcolor Pigment) (in which A in general formula (1) has the structure of formula (2))
FLUORESCENT BRIGHTENER KSN (manufactured by Xcolor Pigment) (in which A in general formula (1) has the structure of formula (5))
[Pigment Dispersion]
Cyan pigment dispersion prepared as described above
[Photopolymerization Initiator Auxiliary Agent]
SPEEDCURE 7040 (manufactured by Lambson)

[Polymerization Inhibitor]
Irgastab UV10 (manufactured by BASF Corporation)
[Surfactant]
KF-352 (manufactured by Shin-Etsu Chemical Co., Ltd.)
Incidentally, for each of ink samples 1 to 32 containing the fluorescent brightener, a control ink having the same composition except that the fluorescent brightener is not contained was prepared. In the control ink, the amount of the photocurable compound was increased so that the total parts by mass of the inkjet ink be 100.
2. Formation of Image
[Image Forming Method]
Each of the sample inks and their control inks shown in Tables 1 to 7 was used for forming a solid image with a size of 5 cm×5 cm on coated paper A for printing (OK Top Coat, basis weight: 128 g/m$^2$, manufactured by Oji Paper Co., Ltd.) in the following manner:
As a discharge recording head of a line-type inkjet recording apparatus, a piezo head having a nozzle diameter of 20 μm and including 512 nozzles (in two rows each of 256 nozzles, arranged in a zigzag manner, nozzle pitch in each row: 360 dpi) was used. The temperature of the inkjet head was set to 80° C., and under discharging conditions for attaining an amount of every droplet of 2.5 pl, the ink was ejected at a rate of about 6 m/s, so as to record an image at resolution of 1,440 dpi×1,440 dpi. The recording rate was set to 500 mm/s. The formation of the image was carried out under an environment of 23° C. and 55% RH. It is noted that the term "dpi" refers to the number of dots per 2.54 cm.
After forming the image, the ink was cured by irradiating the image with ultraviolet rays using an LED lamp (manufactured by Phoseon Technology Inc., 395 nm, water-cooled LED) disposed in a downstream portion of the recording apparatus.
3. Evaluation of Image
(Evaluation of Image Glossiness) The 60°-glossiness of each solid image formed on the coated paper A for printing by using each of the ink samples and the control inks was measured using a gloss meter PG-II manufactured by Nippon Denshoku Industries Co., Ltd.
Next, a difference between the 60°-glossiness obtained using the ink sample and the 60°-glossiness obtained using the control ink was obtained as a glossiness change caused by the use of the fluorescent brightener. The thus obtained glossiness change was evaluated based on the following criteria.
Incidentally, inks 29 to 32 not containing the fluorescent brightener was evaluated as "0" (the glossiness of the image did not increase).
0: The glossiness of the image did not increase. (no effect)
1: Glossiness increase exceeded 0 and was less than 20.
2: Glossiness increase was 20 or more and less than 30.
3: Glossiness increase was 30 or more.
(Evaluation of Image Surface Shape)
A surface of a solid image with a size of 5 cm×5 cm printed by the above-described method on coated paper A for printing used as the substrate was observed with a scanning electron microscope (SEM). As observation conditions, an LEI (a lower secondary electron image) was used to obtain an image at 2,000-fold magnification under conditions of an acceleration voltage of 1 kV, 20 μA and non-vapor-deposition, and recesses found in a range of 600×450 μm were observed. It is noted that a recess refers to a recessed portion causing a difference in brightness in the image. Based on the observed recesses, an image surface shape was evaluated based on the following criteria.
0: Each recess had a width exceeding 10 μm, and large irregularities were found.

1: Each recess had a width of 5 μm or more and 10 μm or less.

2: Each recess had a width of 2 μm or more and less than 5 μm.

3: No irregularities were found and the image surface was flat.

Incidentally, if the widths of the observed recesses were largely varied, the evaluation was made based on a criterion value to which the largest number of recesses corresponded. Besides, recesses having widths less than 2 μm were regarded to be flat.

(Evaluation of Change in Image Color)

The L*a*b* value of each solid image formed by the above-described method on the coated paper A for printing by using each of the ink samples and the control inks was measured using a spectrophotometer FD-7, manufactured by Konica Minolta, Inc.

Next, a color difference ΔE between the L*a*b* value obtained using each ink sample and the L*a*b* value obtained using the corresponding control ink was obtained. The thus obtained color difference ΔE was evaluated based on the following criteria.

Incidentally, inks 29 to 32 not containing the fluorescent brightener were evaluated as "3" (the change in color could not be visually found).

0: ΔE>5 The change in color was largely found.

1: ΔE=3 to 5 The change in color was found.

2: ΔE=1 to 3 The change in color was slightly found but allowable.

3: ΔE<1 The change in color could not be visually found.

The evaluation results are shown in Tables 1 to 7 below.

TABLE 1

| Actinic Radiation-Curable Inkjet Ink Component | | | Sample 1 | Sample 2 | Sample 3 | Sample 4 | Sample 5 |
|---|---|---|---|---|---|---|---|
| Photocurable Compound | Monofunctional Photocurable Compound | THFA | 20.0 | 20.0 | 20.0 | 20.0 | 20.0 |
| | Polyfunctional Photocurable Compound | 3PO-TMPTA | 30.0 | 30.0 | 30.0 | 30.0 | 30.0 |
| | | MPDDA | 23.8 | | | | |
| | | VEEA | | 27.3 | | | |
| | | PEG400DA | | | 26.1 | | |
| | | 6EO-TMPTA | | | | 27.3 | |
| | | 4EO-PETTA | | | | | 26.1 |
| | | PO-NPGDA | | | | | |
| Photopolymerization Initiator | α-Aminoketone-based Compound | IRGACURE 369 | 3.0 | | | | 3.0 |
| | | IRGACURE 907 | | 3.0 | | | |
| | Acylphosphine-based Compound | DAROCURE TPO | | | 3.0 | | |
| | | IRGACURE 819 | | | | 3.0 | |
| | Thioxanthone-based Compound | SPEEDCURE ITX | 0.5 | 0.5 | 0.5 | 0.5 | 0.5 |
| | Gelling Agent | Lauric Acid Amide | 12.0 | 5.0 | 5.0 | 5.0 | 5.0 |
| | | Ethylene Glycol Distearate | | 4.0 | 4.0 | 4.0 | 4.0 |
| | | Stearyl Stearate | | | | | |
| | | Distearyl Ketone | | | | | |
| Fluorescent Brightener | Coumarin-based Compound | Hakkol P | 0.5 | 0.005 | 1.2 | | |
| | Stilbene-based Compound | FLUORESCENT BRIGHTENER FP-127 | | | | | |
| | | FLUORESCENT BRIGHTENER OBK | | | | | |
| | Benzoxazole-based Compound | FLUORESCENT BRIGHTENER OB | | | | 0.005 | 1.2 |
| | | FLUORESCENT BRIGHTENER OB-1 | | | | | |
| | | FLUORESCENT BRIGHTENER PF | | | | | |
| | | FLUORESCENT BRIGHTENER PB | | | | | |
| | | FLUORESCENT BRIGHTENER KCB | | | | | |
| | | FLUORESCENT BRIGHTENER KSN | | | | | |
| Pigment Dispersion | | | 10.0 | 10.0 | 10.0 | 10.0 | 10.0 |
| Polymerization Inhibitor | | Irgastub UV-10 | 0.1 | 0.1 | 0.1 | 0.1 | 0.1 |
| Surfactant | | KF-352 | 0.1 | 0.1 | 0.1 | 0.1 | 0.1 |
| Total Parts by Mass of Inkjet Ink | | | 100.0 | 100.0 | 100.0 | 100.0 | 100.0 |
| Evaluation | | Image Glossiness | 1 | 1 | 2 | 1 | 2 |
| | | Surface Shape | 1 | 1 | 2 | 1 | 2 |
| | | Change in Image Color | 1 | 2 | 1 | 3 | 1 |

TABLE 2

| Actinic Radiation-Curable Inkjet Ink Component | | | Sample 6 | Sample 7 | Sample 8 |
|---|---|---|---|---|---|
| Photocurable Compound | Monofunctional Photocurable Compound | THFA | 20.0 | 20.0 | 20.0 |
| | Polyfunctional Photocurable Compound | 3PO-TMPTA | 30.0 | 30.0 | 30.0 |
| | | MPDDA | | | |
| | | VEEA | | | |
| | | PEG400DA | | | |
| | | 6EO-TMPTA | 26.9 | | |
| | | 4EO-PETTA | | 26.9 | |
| | | PO-NPGDA | | | 26.9 |
| Photopolymerization Initiator | α-Aminoketone-based Compound | IRGACURE 369 | | 3.0 | |
| | | IRGACURE 907 | | | 3.0 |
| | Acylphosphine-based Compound | DAROCURE TPO | | | |
| | | IRGACURE 819 | 3.0 | | |
| | Thioxanthone-based Compound | SPEEDCURE ITX | 0.5 | 0.5 | 0.5 |
| | Gelling Agent | Lauric Acid Amide | 5.0 | 5.0 | 5.0 |
| | | Ethylene Glycol Distearate | 4.0 | 4.0 | 4.0 |
| | | Stearyl Stearate | | | |
| | | Distearyl Ketone | | | |
| Fluorescent Brightener | Coumarin-based Compound | Hakkol P | 0.5 | | |
| | Stilbene-based Compound | FLUORESCENT BRIGHTENER FP-127 | | 0.5 | |
| | | FLUORESCENT BRIGHTENER OBK | | | 0.5 |
| | Benzoxazole-based Compound | FLUORESCENT BRIGHTENER OB | | | |
| | | FLUORESCENT BRIGHTENER OB-1 | | | |
| | | FLUORESCENT BRIGHTENER PF | | | |
| | | FLUORESCENT BRIGHTENER PB | | | |
| | | FLUORESCENT BRIGHTENER KCB | | | |
| | | FLUORESCENT BRIGHTENER KSN | | | |
| Pigment Dispersion | | | 10.0 | 10.0 | 10.0 |
| Polymerization Inhibitor | | Irgastub UV-10 | 0.1 | 0.1 | 0.1 |
| Surfactant | | KF-352 | 0.1 | 0.1 | 0.1 |
| Total Parts by Mass of Inkjet Ink | | | 100.0 | 100.0 | 100.0 |
| Evaluation | | Image Glossiness | 2 | 2 | 2 |
| | | Surface Shape | 2 | 2 | 2 |
| | | Change in Image Color | 1 | 1 | 1 |

TABLE 3

| Actinic Radiation-Curable Inkjet Ink Component | | | Sample 9 | Sample 10 | Sample 11 | Sample 12 | Sample 13 | Sample 14 |
|---|---|---|---|---|---|---|---|---|
| Photocurable Compound | Monofunctional Photocurable Compound | THFA | 20.0 | 20.0 | 20.0 | 20.0 | 20.0 | 20.0 |
| | Polyfunctional Photocurable Compound | 3PO-TMPTA | 30.0 | 30.0 | 30.0 | 30.0 | 30.0 | 30.0 |
| | | MPDDA | 26.9 | | | | | |
| | | VEEA | | 26.9 | | | | |
| | | PEG400DA | | | 26.9 | | | |
| | | 6EO-TMPTA | | | | 26.9 | | |
| | | 4EO-PETTA | | | | | 26.9 | |
| | | PO-NPGDA | | | | | | 26.9 |
| Photopolymerization Initiator | α-Aminoketone-based Compound | IRGACURE 369 | | | | 3.0 | | |
| | | IRGACURE 907 | | | | | 3.0 | |
| | Acylphosphine-based Compound | DAROCURE TPO | 3.0 | | | | 3.0 | |
| | | IRGACURE 819 | | 3.0 | 3.0 | | | 3.0 |
| | Thioxanthone-based Compound | SPEEDCURE ITX | 0.5 | 0.5 | 0.5 | 0.5 | 0.5 | 0.5 |
| | Gelling Agent | Lauric Acid Amide | 5.0 | 5.0 | 5.0 | 5.0 | 5.0 | 5.0 |
| | | Ethylene Glycol Distearate | 4.0 | 4.0 | 4.0 | 4.0 | 4.0 | 4.0 |
| | | Stearyl Stearate | | | | | | |
| | | Distearyl Ketone | | | | | | |

TABLE 3-continued

| Actinic Radiation-Curable Inkjet Ink Component | | | Sample 9 | Sample 10 | Sample 11 | Sample 12 | Sample 13 | Sample 14 |
|---|---|---|---|---|---|---|---|---|
| Fluorescent Brightener | Coumarin-based Compound | Hakkol P | | | | | | |
| | Stilbene-based Compound | FLUORESCENT BRIGHTENER FP-127 | | | | | | |
| | | FLUORESCENT BRIGHTENER OBK | | | | | | |
| | Benzoxazole-based Compound | FLUORESCENT BRIGHTENER OB | 0.5 | | | | | |
| | | FLUORESCENT BRIGHTENER OB-1 | | 0.5 | | | | |
| | | FLUORESCENT BRIGHTENER PF | | | 0.5 | | | |
| | | FLUORESCENT BRIGHTENER PB | | | | 0.5 | | |
| | | FLUORESCENT BRIGHTENER KCB | | | | | 0.5 | |
| | | FLUORESCENT BRIGHTENER KSN | | | | | | 0.5 |
| Pigment Dispersion | | | 10.0 | 10.0 | 10.0 | 10.0 | 10.0 | 10.0 |
| Polymerization Inhibitor | | Irgastub UV-10 | 0.1 | 0.1 | 0.1 | 0.1 | 0.1 | 0.1 |
| Surfactant | | KF-352 | 0.1 | 0.1 | 0.1 | 0.1 | 0.1 | 0.1 |
| Total Parts by Mass of Inkjet Ink | | | 100.0 | 100.0 | 100.0 | 100.0 | 100.0 | 100.0 |
| Evaluation | | Image Glossiness | 2 | 2 | 2 | 2 | 2 | 2 |
| | | Surface Shape | 3 | 3 | 3 | 3 | 3 | 3 |
| | | Change in Image Color | 2 | 2 | 2 | 2 | 2 | 2 |

TABLE 4

| Actinic Radiation-Curable Inkjet Ink Component | | | Sample 15 | Sample 16 | Sample 17 | Sample 18 | Sample 19 |
|---|---|---|---|---|---|---|---|
| Photocurable Compound | Monofunctional Photocurable Compound | THFA | 20.0 | 20.0 | 20.0 | 20.0 | 20.0 |
| | Polyfunctional Photocurable Compound | 3PO-TMPTA | 30.0 | 30.0 | 30.0 | 30.0 | 30.0 |
| | | MPDDA | 32.9 | | | | |
| | | VEEA | | 32.9 | | | |
| | | PEG400DA | | | 33.9 | | |
| | | 6EO-TMPTA | | | | 33.9 | |
| | | 4EO-PETTA | | | | | 33.4 |
| | | PO-NPGDA | | | | | |
| Photopolymerization Initiator | α-Aminoketone-based Compound | IRGACURE 369 | 3.0 | | | | 3.0 |
| | | IRGACURE 907 | | 3.0 | | | |
| | Acylphosphine-based Compound | DAROCURE TPO | | | 3.0 | | |
| | | IRGACURE 819 | | | | 3.0 | |
| | Thioxanthone-based Compound | SPEEDCURE ITX | 0.5 | 0.5 | 0.5 | 0.5 | 0.5 |
| | Gelling Agent | Lauric Acid Amide | | | | | |
| | | Ethylene Glycol Distearate | 1.0 | 1.0 | | | |
| | | Steary Stearate | 2.0 | | 2.0 | | 2.0 |
| | | Distearyl Ketone | | 2.0 | | 2.0 | 0.5 |
| Fluorescent Brightener | Coumarin-based Compound | Hakkol P | | | | | |
| | Stilbene-based Compound | FLUORESCENT BRIGHTENER FP-127 | | | | | |
| | | FLUORESCENT BRIGHTENER OBK | | | | | |

TABLE 4-continued

| Actinic Radiation-Curable Inkjet Ink Component | | Sample 15 | Sample 16 | Sample 17 | Sample 18 | Sample 19 |
|---|---|---|---|---|---|---|
| Benzoxazole-based Compound | FLUORESCENT BRIGHTENER OB | 0.5 | | | | |
| | FLUORESCENT BRIGHTENER OB-1 | | 0.5 | | | |
| | FLUORESCENT BRIGHTENER PF | | | 0.5 | | |
| | FLUORESCENT BRIGHTENER PB | | | | 0.5 | |
| | FLUORESCENT BRIGHTENER KCB | | | | | 0.5 |
| | FLUORESCENT BRIGHTENER KSN | | | | | |
| Pigment Dispersion | | 10.0 | 10.0 | 10.0 | 10.0 | 10.0 |
| Polymerization Inhibitor | Irgastub UV-10 | 0.1 | 0.1 | 0.1 | 0.1 | 0.1 |
| Surfactant | KF-352 | 0.1 | 0.1 | 0.1 | 0.1 | 0.1 |
| Total Parts by Mass of Inkjet Ink | | 100.0 | 100.0 | 100.0 | 100.0 | 100.0 |
| Evaluation | Image Glossiness | 2 | 2 | 2 | 2 | 2 |
| | Surface Shape | 3 | 3 | 3 | 3 | 3 |
| | Change in Image Color | 3 | 3 | 3 | 3 | 3 |

TABLE 5

| | Actinic Radiation-Curable Inkjet Ink Component | | Sample 20 | Sample 21 | Sample 22 | Sample 23 | Sample 24 |
|---|---|---|---|---|---|---|---|
| Photocurable Compound | Monofunctional Photocurable Compound | THFA | | | | | |
| | Polyfunctional Photocurable Compound | 3PO-TMPTA | 30.0 | 30.0 | 30.0 | 30.0 | 30.0 |
| | | MPDDA | 20.0 | | | | |
| | | VEEA | | 20.0 | | | |
| | | PEG400DA | 32.9 | 32.9 | 53.9 | 33.9 | 33.4 |
| | | 6EO-TMPTA | | | | 20.0 | |
| | | 4EO-PETTA | | | | | 20.0 |
| | | PO-NPGDA | | | | | |
| Photopolymerization Initiator | α-Aminoketone-based Compound | IRGACURE 369 | | | | 3.0 | |
| | | IRGACURE 907 | 3.0 | | | | 3.0 |
| | Acylphosphine-based Compound | DAROCURE TPO | | 3.0 | | | |
| | | IRGACURE 819 | | | 3.0 | | |
| | Thioxanthone-based Compound | SPEEDCURE ITX | 0.5 | 0.5 | 0.5 | 0.5 | 0.5 |
| | Gelling Agent | Lauric Acid Amide | | | | | |
| | | Ethylene Glycol Distearate | 1.0 | 1.0 | | | |
| | | Stearyl Stearate | 2.0 | | 2.0 | | 2.0 |
| | | Distearyl Ketone | | 2.0 | | 2.0 | 0.5 |
| Fluorescent Brightener | Coumarin-based Compound | Hakkol P | | | | | |
| | Stilbene-based Compound | FLUORESCENT BRIGHTENER FP-127 | | | | | |
| | | FLUORESCENT BRIGHTENER OBK | | | | | |
| | Benzoxazole-based Compound | FLUORESCENT BRIGHTENER OB | | | 0.5 | | |
| | | FLUORESCENT BRIGHTENER OB-1 | | | | 0.5 | |
| | | FLUORESCENT BRIGHTENER PF | | | | | 0.5 |
| | | FLUORESCENT BRIGHTENER PB | | | | | |
| | | FLUORESCENT BRIGHTENER KCB | | | | | |
| | | FLUORESCENT BRIGHTENER KSN | | 0.5 | | | |
| Pigment Dispersion | | | 10.0 | 10.0 | 10.0 | 10.0 | 10.0 |
| Polymerization Inhibitor | | Irgastub UV-10 | 0.1 | 0.1 | 0.1 | 0.1 | 0.1 |
| Surfactant | | KF-352 | 0.1 | 0.1 | 0.1 | 0.1 | 0.1 |
| Total Parts by Mass of Inkjet Ink | | | 100.0 | 100.0 | 100.0 | 100.0 | 100.0 |
| Evaluation | | Image Glossiness | 3 | 3 | 3 | 3 | 3 |
| | | Surface Shape | 3 | 3 | 3 | 3 | 3 |
| | | Change in Image Color | 3 | 3 | 3 | 3 | 3 |

TABLE 6

| Actinic Radiation-Curable Inkjet Ink Component | | | Sample 25 | Sample 26 | Sample 27 | Sample 28 |
|---|---|---|---|---|---|---|
| Photocurable Compound | Monofunctional Photocurable Compound | THFA | 20.0 | 20.0 | 20.0 | |
| | Polyfunctional Photocurable Compound | 3PO-TMPTA | 30.0 | 30.0 | 30.0 | 30.0 |
| | | MPDDA | 36.3 | | | |
| | | VEEA | | 35.9 | | |
| | | PEG400DA | | | 35.9 | |
| | | 6EO-TMPTA | | | | 35.9 |
| | | 4EO-PETTA | | | | 20.0 |
| | | PO-NPGDA | | | | |
| Photopolymerization Initiator | α-Aminoketone-based Compound | IRGACURE 369 | | | 3.0 | |
| | | IRGACURE 907 | | | | 3.0 |
| | Acylphosphine-based Compound | DAROCURE TPO | 3.0 | | | |
| | | IRGACURE 819 | | 3.0 | | |
| | Thioxanthone-based Compound | SPEEDCURE ITX | 0.5 | 0.5 | 0.5 | 0.5 |
| | Gelling Agent | Lauric Acid Amide | | | | |
| | | Ethylene Glycol Distearate | | | | |
| | | Stearyl Stearate | | | | |
| | | Distearyl Ketone | | | | |
| Fluorescent Brightener | Coumarin-based Compound | Hakkol P | | 0.5 | | |
| | Stilbene-based Compound | FLUORESCENT BRIGHTENER FP-127 | | | 0.5 | |
| | | FLUORESCENT BRIGHTENER OBK | | | | |
| | Benzoxazole-based Compound | FLUORESCENT BRIGHTENER OB | 0.01 | | | 0.5 |
| | | FLUORESCENT BRIGHTENER OB-1 | | | | |
| | | FLUORESCENT BRIGHTENER PF | | | | |
| | | FLUORESCENT BRIGHTENER PB | | | | |
| | | FLUORESCENT BRIGHTENER KCB | | | | |
| | | FLUORESCENT BRIGHTENER KSN | | | | |
| | Pigment Dispersion | | 10.0 | 10.0 | 10.0 | 10.0 |
| | Polymerization Inhibitor | Irgastub UV-10 | 0.1 | 0.1 | 0.1 | 0.1 |
| | Surfactant | KF-352 | 0.1 | 0.1 | 0.1 | 0.1 |
| | Total Parts by Mass of Inkjet Ink | | 100.0 | 100.0 | 100.0 | 100.0 |
| | Evaluation | Image Glossiness | 0 | 0 | 0 | 0 |
| | | Surface Shape | 3 | 3 | 3 | 3 |
| | | Change in Image Color | 0 | 0 | 0 | 0 |

TABLE 7

| Actinic Radiation-Curable Inkjet Ink Component | | | Sample 29 | Sample 30 | Sample 31 | Sample 32 |
|---|---|---|---|---|---|---|
| Photocurable Compound | Monofunctional Photocurable Compound | THFA | 20.0 | 20.0 | 20.0 | |
| | Polyfunctional Photocurable Compound | 3PO-TMPTA | 30.0 | 30.0 | 30.0 | 30.0 |
| | | MPDDA | 24.3 | | | |
| | | VEEA | | 27.4 | | |
| | | PEG400DA | | | 33.4 | |
| | | 6EO-TMPTA | | | | 31.9 |
| | | 4EO-PETTA | | | | 20.0 |
| | | PO-NPGDA | | | | |
| Photopolymerization Initiator | α-Aminoketone-based Compound | IRGACURE 369 | | | 3.0 | |
| | | IRGACURE 907 | | | | 3.0 |
| | Acylphosphine-based Compound | DAROCURE TPO | 3.0 | | | |
| | | IRGACURE 819 | | 3.0 | | |
| | Thioxanthone-based Compound | SPEEDCURE ITX | 0.5 | 0.5 | 0.5 | 0.5 |
| | Gelling Agent | Lauric Acid Amide | 12.0 | 5.0 | | 2.0 |
| | | Ethylene Glycol Distearate | | 4.0 | 1.0 | |
| | | Stearyl Stearate | | | 2.0 | 2.0 |
| | | Distearyl Ketone | | | | 0.5 |

TABLE 7-continued

| Actinic Radiation-Curable Inkjet Ink Component | | | Sample 29 | Sample 30 | Sample 31 | Sample 32 |
|---|---|---|---|---|---|---|
| Fluorescent Brightener | Coumarin-based Compound | Hakkol P | | | | |
| | Stilbene-based Compound | FLUORESCENT BRIGHTENER FP-127 | | | | |
| | | FLUORESCENT BRIGHTENER OBK | | | | |
| | Benzoxazole-based Compound | FLUORESCENT BRIGHTENER OB | | | | |
| | | FLUORESCENT BRIGHTENER OB-1 | | | | |
| | | FLUORESCENT BRIGHTENER PF | | | | |
| | | FLUORESCENT BRIGHTENER PB | | | | |
| | | FLUORESCENT BRIGHTENER KCB | | | | |
| | | FLUORESCENT BRIGHTENER KSN | | | | |
| | Pigment Dispersion | | 10.0 | 10.0 | 10.0 | 10.0 |
| | Polymerization Inhibitor | Irgastub UV-10 | 0.1 | 0.1 | 0.1 | 0.1 |
| | Surfactant | KF-352 | 0.1 | 0.1 | 0.1 | 0.1 |
| | Total Parts by Mass of Inkjet Ink | | 100.0 | 100.0 | 100.0 | 100.0 |
| | Evaluation | Image Glossiness | 0 | 0 | 0 | 0 |
| | | Surface Shape | 0 | 0 | 1 | 1 |
| | | Change in Image Color | 3 | 3 | 3 | 3 |

According to the results shown in Tables 1 to 7, in all the images formed by using the actinic radiation-curable inkjet inks of the present invention each containing the photocurable compound, the photopolymerization initiator, the crystalline gelling agent and the fluorescent brightener, the glossiness was increased, there were no large irregularities and granularity on the surface thereof, and the change in color of the image was small.

In using samples 6 and 9 in each of which the content of the fluorescent brightener was 0.01 mass % or more and 1.0 mass % or less, the glossiness and the surface shape were improved as compared with samples 2 and 4 in each of which the content of the fluorescent brightener was less than 0.01 mass % (0.005 mass %), and the surface shape and the change in color were improved respectively as compared with samples 3 and 5 in each of which the content of the fluorescent brightener exceeded 1.0 mass % (1.2 mass %). Besides, in using sample 6 in which the content of the gelling agent was 1 mass % or more and 10 mass % or less, the glossiness and the surface shape were improved as compared with sample 1 in which the composition was similar but the content of the gelling agent exceeded 10 mass % (12 mass %).

Furthermore, the images formed by using samples 6 to 8 in each of which the coumarin-based or stilbene-based compound was used as the fluorescent brightener were evaluated as "2" for the surface shape and as "1" for the change in color, and those formed by using samples 9 to 14 of Table 3 in each of which the compound represented by general formula (1) was used as the fluorescent brightener were improved to be evaluated as "3" for the surface shape and as "2" for the change in color.

In using samples 15 to 19 of Table 4 and samples 20 to 24 of Table 5 in each of which the compound of general formula (1) was used as the fluorescent brightener and further the compound represented by general formula (G1) or (G2) was used as the gelling agent, the surface shape and the change in color were evaluated both as "3", and thus, high quality images were obtained.

According to the results of Table 6 using the inks each containing the fluorescent brightener but not containing the gelling agent, although the surface shape was evaluated as "3" and was flat, the glossiness was not increased at all, and $\Delta E$ exceeded 5 and the change in color was large. Besides, according to the results of Table 7 using the inks each not containing the fluorescent brightener but containing the gelling agent, $\Delta E$ was less than 1 and the change in color was so small that it could not be visually found, but the surface shape was evaluated as "0" or "1", and thus large irregularities were found, and the glossiness was not increased at all.

This application is based upon and claims the benefit of priority of Japanese Patent Application No. 2016-120613, filed on Jun. 17, 2016. The entire contents of the patent application are incorporated herein by reference.

INDUSTRIAL APPLICABILITY

Using the actinic radiation-curable inkjet ink of the present invention enables forming an image having high glossiness and causing less glossiness incompatibility with a substrate. Therefore, the present invention is expected to broaden the range of applications of a gel ink in an inkjet method and contribute to the development and dissemination of the technology in the technical field.

The invention claimed is:

1. An actinic radiation-curable inkjet ink capable of undergoing sol-gel phase transition, comprising a photocurable compound, a photopolymerization initiator and a crystalline gelling agent,
    wherein the actinic radiation-curable inkjet ink further comprises a fluorescent brightener, and the fluorescent brightener is dissolved in the ink.
2. The actinic radiation-curable inkjet ink according to claim 1, wherein a content of the fluorescent brightener is 0.01 mass % or more and 1.0 mass % or less with respect to a total mass of the actinic radiation-curable inkjet ink.

3. The actinic radiation-curable inkjet ink according to claim 1, wherein the fluorescent brightener contains a compound represented by the following general formula (1):

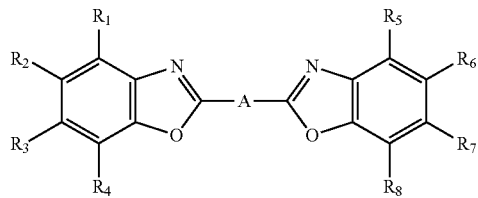
(1)

wherein $R_1$ to $R_8$ each independently represent a hydrogen atom or an alkyl group, and A represents a linking group represented by any of the following formulas (2) to (5):

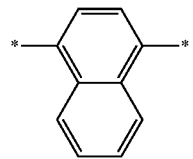
(2)

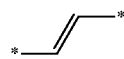
(3)

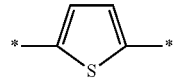
(4)

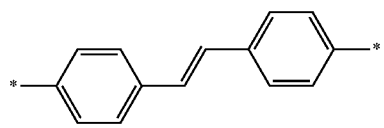
(5)

wherein each * represents a bonding position of A in each formula.

4. The actinic radiation-curable inkjet ink according to claim 1, wherein a content of the crystalline gelling agent is 1 mass % or more and 10 mass % or less with respect to a total mass of the actinic radiation-curable inkjet ink.

5. The actinic radiation-curable inkjet ink according to claim 1, wherein the crystalline gelling agent contains at least one selected from the group consisting of compounds represented by the following general formulas (G1) and (G2):

$R_9$—CO—$R_{10}$   General formula (G1):

$R_{11}$—COO—$R_{12}$   General formula (G2):

wherein $R_9$ to $R_{12}$ each independently represent a straight chain or branched chain hydrocarbon group having 9 or more and 25 or less carbon atoms.

6. The actinic radiation-curable inkjet ink according to claim 1, further comprising a colorant.

7. The actinic radiation-curable inkjet ink according to claim 1, wherein the fluorescent brightener is crystalized in the ink in a course of curing the photocurable compound.

8. An image forming method, comprising:
discharging the actinic radiation-curable inkjet ink according to claim 1 from a nozzle of an inkjet recording apparatus and causing the actinic radiation-curable inkjet ink to land on a substrate; and
curing the actinic radiation-curable inkjet ink by irradiating, with actinic radiation, the actinic radiation-curable inkjet ink landed on the substrate.

* * * * *